(12) United States Patent
Lamprillo

(10) Patent No.: US 7,836,775 B2
(45) Date of Patent: Nov. 23, 2010

(54) YARN TENSIOMETER

(75) Inventor: Stefano Lamprillo, Biella (IT)

(73) Assignee: IRO AB, Ulricehamn (SE)

( * ) Notice: Subject to any disclaimer, the term of this patent is extended or adjusted under 35 U.S.C. 154(b) by 106 days.

(21) Appl. No.: 12/224,413

(22) PCT Filed: Jan. 16, 2007

(86) PCT No.: PCT/EP2007/000342

§ 371 (c)(1),
(2), (4) Date: Nov. 20, 2008

(87) PCT Pub. No.: WO2007/101497

PCT Pub. Date: Sep. 13, 2007

(65) Prior Publication Data

US 2009/0301214 A1    Dec. 10, 2009

(30) Foreign Application Priority Data

Mar. 9, 2006   (SE) .................................. 0600531

(51) Int. Cl.
*G01B 7/16* (2006.01)
(52) U.S. Cl. ......................................... 73/769; 73/760
(58) Field of Classification Search ............ 73/760–860
See application file for complete search history.

(56) References Cited

U.S. PATENT DOCUMENTS

| | | | |
|---|---|---|---|
| 4,205,844 A * | 6/1980 | Gombas | 473/537 |
| 5,136,202 A | 8/1992 | Carenzo et al. | |
| 5,176,580 A * | 1/1993 | Stamm et al. | 474/101 |
| 5,243,812 A * | 9/1993 | Strobel et al. | 57/263 |
| 6,334,608 B1 * | 1/2002 | Stubler | 267/140.13 |
| 6,640,935 B1 * | 11/2003 | Murakami et al. | 187/401 |
| 7,574,927 B2 * | 8/2009 | Lamprillo | 73/862.41 |
| 7,627,393 B2 * | 12/2009 | Sawodny et al. | 700/228 |

FOREIGN PATENT DOCUMENTS

| | | |
|---|---|---|
| DE | 90 00 443 U1 | 5/1990 |
| DE | 10 2004 034 006 A1 | 2/2006 |
| EP | 0 475 001 A2 | 3/1992 |
| WO | WO 2004/039714 A1 | 5/2004 |
| WO | WO 2006/005518 A1 | 1/2006 |

OTHER PUBLICATIONS

International Search Report dated Jun. 26, 2007.

* cited by examiner

*Primary Examiner*—Max Noori
(74) *Attorney, Agent, or Firm*—Flynn, Thiel, Boutell & Tanis, P.C.

(57) ABSTRACT

Tensiometer for measuring the force imparted by a yarn on a bending element which is secured in a fixation, having a unitary oscillation-damping element made of an intrinsically damping material like rubber or an elastomer, the unitary damping element including a base body secured to the bending element and at least one oscillation body which can oscillate, at least substantially in the direction of the deflection of the bending element, in relation to the base body and to the bending element, and further having an energy dissipation zone between the base body and the oscillation body.

13 Claims, 2 Drawing Sheets

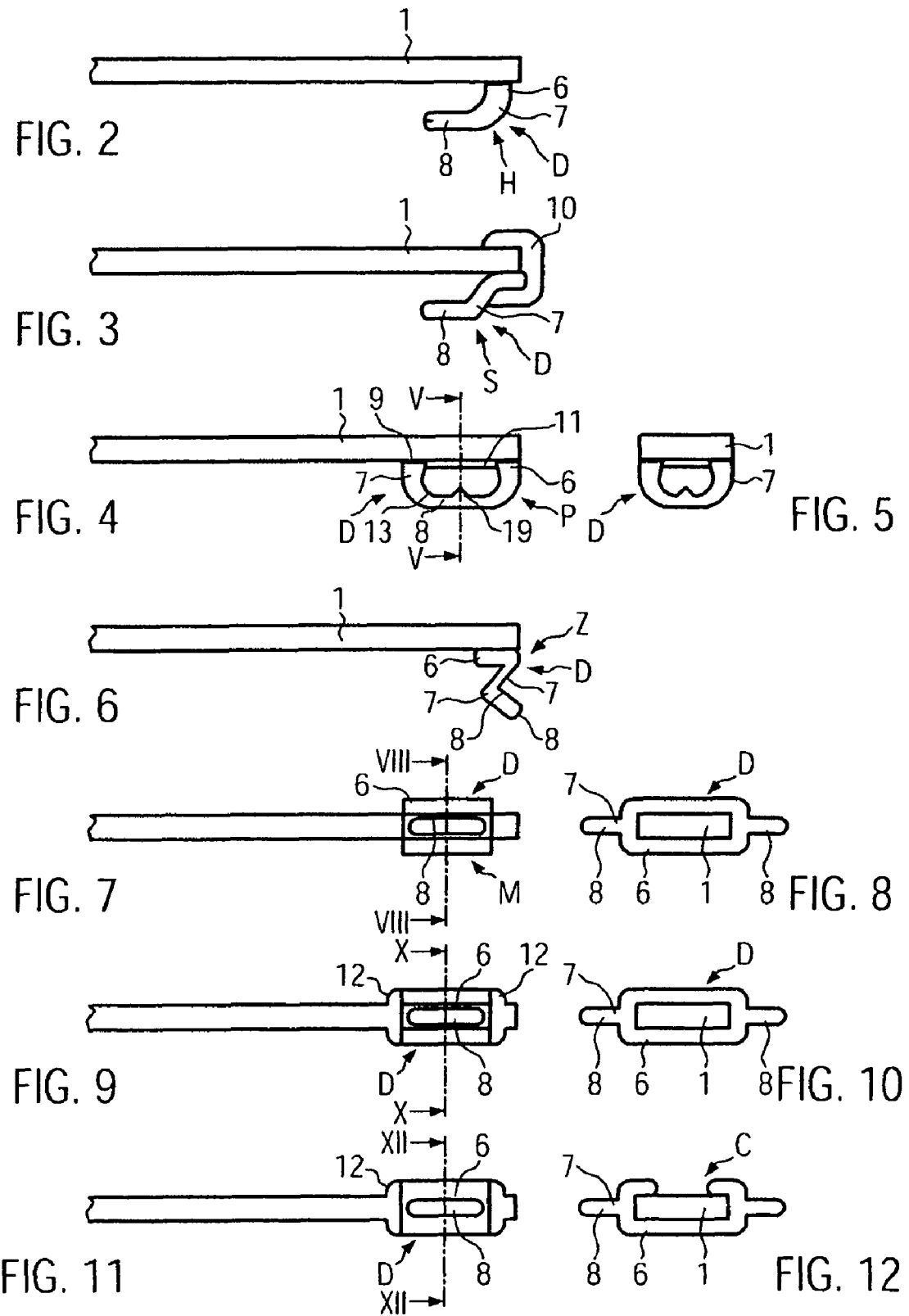

YARN TENSIOMETER

FIELD OF THE INVENTION

The invention relates to a yarn tensiometer for measuring the force imparted by a yarn to a bending element.

BACKGROUND OF THE INVENTION

In particular when the yarn is running, while the tensiometer measures the force imparted by the yarn, the bending element may be excited to oscillate. The oscillations might falsify the precise reading of the force or the yarn tension. The damping element secured to the bending element, for this reason, has to dampen the oscillations to a predetermined, desirable extent.

The tensiometer known from EP 0 475 001 A has a foam material strip glued to the side of the bending element in order to dampen oscillations of the bending element.

The tensiometer known from DE 90 00 443 U has a damping element made from fluor composition rubber which is secured to the bending element by a nipple engaging into a longitudinal slot of the bending element in order to adjust the position of the damping element in the longitudinal direction and to adjust the damping effect.

The tensiometer known from WO 2006/005518 A contains an elastomeric element glued to the bending arm and an oscillation-extinguishing mass glued to the free side of the elastomeric element.

The tensiometer known from WO 2004/039714 A has a massive pin protruding from the bending element. The pin engages into a stationary cylinder filled with low viscosity liquid.

Known tensiometers with a "massive", unitary damping element made of rubber or elastomer material has an insufficient damping effect. Additionally, known tensiometers, having some means for obtaining the desirable damping effect, are usually very prone to collect lint or avivage (chemical substance added to the yarn).

A tensiometer for measuring the force imparted by a yarn to a bending element according to the invention includes a bending element secured in a fixation and deflectable by the yarn. The tensiometer includes a unitary oscillation-damping element made of an intrinsically damping material like rubber or an elastomer, and the damping element is secured to the bending element. The unitary damping element includes a base body secured to the bending element and an oscillation body which can oscillate at least essentially in the direction in which the bending element is deflected by the yarn in relation to the base body and to the bending element, and an energy dissipation zone is provided in the damping element between the oscillation body and the base body.

It is an object of the invention to provide a tensiometer of the kind as referred to above, which can be manufactured at low cost, is reliable and does not suffer from lint or avivage collection.

The unitary damping body, having at least one oscillation body, which can oscillate substantially in the direction in which the bending arm is deflected by the yarn, allows fine-tuning of the damping effect. Only the base body has to be secured at the bending element, e.g. by clamping or gluing. The oscillation body, when excited by oscillations of the bending arm, will oscillate in relation to the base body and the bending arm, causing energy dissipation in the energy dissipation zone. Hence, the oscillation body functions like an oscillation-extinguishing mass although the oscillation body is a unitary component of the damping element. The damping effect is excellent. The tensiometer is not prone to lint or avivage depositions. The damping effect is not only achieved by the energy dissipation in the energy dissipation zone, but also by a damping effect from the ambient air, because the oscillations of the oscillation body and in turn of the bending element also are damped in the ambient air. The tensiometer can be produced in a large volume for low cost and via a small number of assembly steps (less assembling-manpower needed).

In an expedient embodiment the oscillation body is freely ending "in the air". This concept does not only allow a relatively unrestricted oscillation of the oscillation body, but also avoids lint or avivage depositions which could negatively influence the damping behaviour. Due to the oscillation of the oscillation body, contamination will be strongly repelled or "pushed away" from the oscillation body.

In an expedient embodiment the damping element has a U-shape. The first U-leg is secured to the bending element and constitutes the base body. The second U-leg is freely ending in the ambient air and constitutes the oscillation body. The U-bend constitutes the energy dissipation zone. The U-shaped damping element is a cheap component, e.g. a cut section of an extruded profile made of rubber or elastomer material. The fixation of the damping element only needs one gluing zone or one clamping zone.

Both U-legs of the U-shaped damping element may extend substantially in the longitudinal direction of the bending element. The second U-leg has a large unobstructed range for the oscillations and will be damped not only in the energy dissipation zone but also on both sides by the surrounding air. It is expedient to position the damping element as close as possible to the region of the bending element where the yarn contacts the bending element.

In another embodiment the damping element is an essentially L-shaped hook made e.g. from rubber or elastomer material. One L-end is secured to the bending element, while the other L-end extends essentially parallel and distant to the bending element.

In another embodiment an essentially S-shaped damping element is provided such that a first S-leg is secured to the bending element, while the second S-leg extends distant to the bending element. The remaining part of the S-shape constitutes the energy dissipation zone. The damping element also in this case may be a cut-off portion of an extruded "endless" profile.

In another embodiment a wear protector is placed where the yarn contacts the bending element. The wear protector can be used as a clamping element to secure the respective damping element at the bending element. This eliminates the necessity to provide a gluing fixation at all.

In another embodiment the damping element is shaped like a pot e.g. made of rubber or elastomer material. The rim of the pot is secured to the bending element, while the pot bottom constitutes the oscillation body. The outer wall of the pot constitutes the energy dissipation zone. This embodiment is advantageous because it is not at all prone to lint or avivage depositions. The pot bottom oscillates. Due to the rectangular or round shape of the pot a large energy dissipation zone is formed.

In order to enhance the damping behaviour a thickened portion may be formed in the pot bottom, which oscillates in relation to the bending element. Moreover, air enclosed in the pot might contribute to the damping effect.

Alternatively, the pot may be equipped with a venting hole communicating the interior of the pot with the ambient air. This might be advantageous with a view to achieving a reliable and constant damping behaviour.

In another embodiment the damping element has a Z-shape such that several oscillation bodies and several energy dissipation zones are constituted already by the shape of the damping element.

In another embodiment the base body either partially or entirely surrounds the bending element for securing the damping element to the bending element without the need of gluing.

In order to safeguard the position of the damping element on the bending element, at least one recess or projection could be provided on the bending element for positioning the base body of the bending element, which totally or partially surrounds the bending element.

The base body of this embodiment of the damping element may be either a ring or a C-shaped clip using the material elasticity for reliably positioning the damping element on the bending element. At least one ear-shaped tab or "wing" is protruding from the base body such that it extends lateral to the direction of the deflection of the bending element. This embodiment is particularly advantageous because it is nearly entirely insensitive to lint or avivage depositions, because there is no cavity where lint can be collected.

In another expedient embodiment two oppositely extending tabs or "wings" are formed on the base body such that the damping effect is obtained symmetrically with respect to the plane in which the bending element oscillates.

BRIEF DESCRIPTION OF THE DRAWINGS

Embodiments of the invention will be explained with the help of the drawings, in which:

FIG. 2 is a side view of another embodiment,
FIG. 3 is a side view of another embodiment,
FIG. 4 is a side view, partially cut, of another embodiment,
FIG. 5 is a second view of the embodiment of FIG. 4 in the section plane V-V,
FIG. 6 is a side view of another embodiment,
FIG. 7 is a side view of another embodiment,
FIG. 8 is a sectional view of the embodiment of FIG. 7 in the section plane VIII-VIII,
FIG. 9 is a side view of another embodiment,
FIG. 10 is a sectional view in the section plane X-X in FIG. 9,
FIG. 11 is a side view of a further embodiment,
and
FIG. 12 is a sectional view in the section plane XII-XII in FIG. 11.

DETAILED DESCRIPTION

Figure 1:
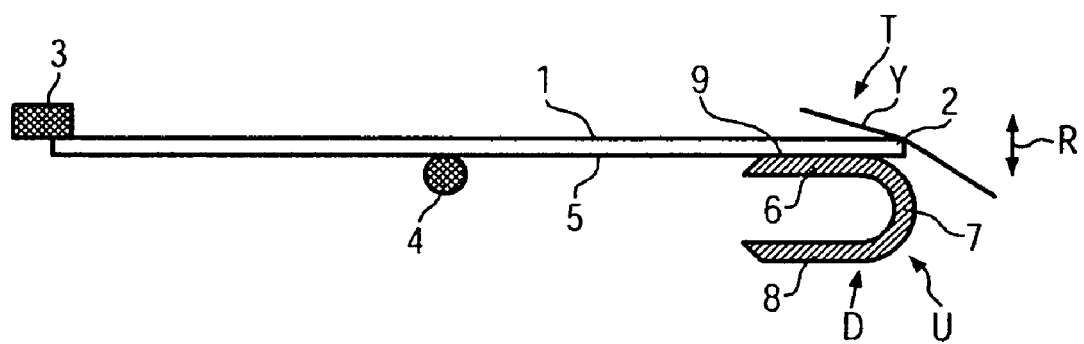
FIG. 1 is a schematic side view of a yarn tensiometer.

FIG. 1 schematically illustrates a tensiometer T for use in connection with any kind of handling/processing of yarn in order to measure the force imparted by a yarn Y on a bending element 1 of the tensiometer T, in other words, to measure the tension of a yarn Y, at stand still or when running. In FIG. 1, the bending element 1 is deflected downwardly (double-arrow R indicates the caused oscillation movement) by the force imparted by the contacting yarn Y. The bending element 1 is e.g. a narrow, plate-shaped arm of a relatively "stiff" (dumb) and preferably wear-proof material, preferably a ceramics material like for example Aluminium-Oxide, carrying not shown bending-sensitive/responsive means, e.g. in the form of piezo-resistors (e.g. provided directly on the arm by means of known, s.c. thick-film technique), strain gauges or the like. The bending element 1 has preferably a square cross-section, is held by supports 3, 4 and has a free end 2 around which the yarn Y is deflected. At a lower side 5 of the bending element 1 a damping element D is secured e.g. by gluing (gluing area 9). The damping element D is made from rubber or other elastic material, e.g. an elastomer, or foam material, i.e. a material having intrinsic damping properties, and being flexible to a certain extent. The damping element D may consist of one and the same material or may be manufactured in so-called "two-components-technique", e.g. by injection moulding or extrusion and such that different parts of the unitary damping element D may have different elastic properties or softness.

In FIG. 1 the damping element is shaped like a U with a first U-leg 6, a second U-leg 8 and a curved U-bend 7. The damping element D is secured to the bending element 1 close to the end 2 and such that the outer side of the U-bend 7 faces the end 2. The first leg 6 constitutes a base body of the damping element, the U-bend 7 constitutes an energy dissipation zone of the damping element D, and the second U-leg 8 constitutes an oscillation body of the damping element D. The oscillation body extends essentially parallel to the bending element 1 and with sufficient distance from the base body (first U-leg 6) and the bending element 1 to allow the oscillation body 8, when excited by oscillations of the bending element 1 in the directions of the double-arrow R, to freely oscillate as well. The energy dissipation zone 7 dissipates energy caused by the relative oscillation of the oscillation body and thus dampens the oscillations of the bending element 1. In addition, the ambient air contributes to the damping as well.

The natural frequency of the tensiometer T, without having the damping element, may lie at about 1100 Hz. With the damping element, the natural frequency in the tensiometer is lowered to about 1000 Hz, i.e. by only about 10%, which means that the damping property of the damping element does not heavily effect the band-width of the tensiometer T. By changing the geometrical design of the damping element D and/or the softness of the material and/or the mass distribution and/or the shape of the damping element the damping effect can be selected as desired. Although the oscillation body 8 is able to freely oscillate like a separate body of the damping element, it is a unitary part of the damping element, meaning that the fixation of the damping element only needs one single gluing or fixing area.

In the embodiment of FIG. 2 the damping element D is an L-shaped hook H. The first L-end 6 constituting the base body e.g. is glued to the bending element 1. The second L-end 8 extends essentially parallel and distant to the bending element 1. Here, the L-bend 7 constitutes the energy dissipation zone.

Especially if the bending arm is not in wear-proof material, a wear protector 10, e.g. made of ceramic material, may be clamped or glued to the free end of the bending element 1 (FIG. 3). The wear protector 10, in this embodiment, may also be used to secure the damping element D to the bending element 1. The damping element D in FIG. 3 has the shape of an S. The first S-leg 6 constitutes the base body, the second S-leg constitutes the oscillation body 8, and the part of the S-shape between both legs 6, 7 includes the energy dissipation zone 7.

In the embodiment of FIGS. 4 and 5 the damping element D has the shape of an open pot P. The pot rim constitutes the base body 6 and e.g. is glued to the bending element 1. The pot bottom constitutes the oscillation body 8. The outer wall of the pot constitutes the energy dissipation zone 7. The pot bottom, constituting the oscillation body, may be formed with a thickened portion 19 increasing the mass of the oscillation body 8. The pot P either may be closed on all sides (enclosed air might contribute to the damping effect), or may have at least one vent-hole 13, "connecting" the interior of the pot P with the "open atmosphere". The damping element D in FIGS. 4 and 5 may be an injection-moulded rubber or elastomer part. It even may have a "roof", as indicated at 11, for enlarging the connection surface to the bending element 1.

In the embodiment of FIG. 6 the damping element D has the shape of a Z. This means that the first Z-leg constitutes the base body 6, which e.g. is glued to the bending element 1. Two oscillation bodies 8 are formed by the other parts of the Z, while the bends of the Z constitute two energy dissipation zones 7.

In the embodiment in FIGS. 7 and 8 the damping body D surrounds the bending element 1 like a collar M such that the damping element D is secured to the bending element 1 just by the elasticity and pre-tension of the collar-shaped base part 6. At least one or two oppositely extending tabs or "wings" constitute one or two oscillation bodies 8, which extend laterally in the direction in which the bending element 1 is deflected by the yarn. This embodiment is particularly expedient because it is hardly prone at all to any lint or avivage collection. Furthermore, it is not necessary to glue the damping element D to the bending element 1. For safety's sake, however, the collar-shaped base part 6 may still be glued to the bending element 1.

In the embodiment of FIGS. 9 and 10, similar to FIGS. 7 and 8, the damping element D is surrounding the bending element 1 and is secured to the bending element only by the elasticity and the pre-tension of the collar-shaped base part 6. In order to better position the damping element D on the bending element 1, the bending element 1 may have a recess (not shown) or, as shown, projections 12 between which the collar-shaped base part 6 is situated or positioned when the damping element D is mounted on the bending element 1. The oscillation bodies 8 may e.g. be protruding tabs or "wings" on both opposite sides of the collar-shaped base part. The tabs 8 extend laterally with respect to the direction in which the bending element 1 is deflected by the yarn.

In the embodiment of FIGS. 11 and 12 the base part 6 of the damping element D does not totally surround the bending element 1, but the base part 6 is formed like a clip having the shape of a C. The two oppositely extending oscillation bodies 8 are tabs extending substantially laterally with respect to the direction in which the bending element 1 is deflected by the yarn.

Except in the embodiment of FIGS. 4 and 5, the respective damping element D may be a cut-off section of an "endless", extruded or injection-moulded low-cost profile. Every damping element, described in the above embodiments, consists preferably in its entirety of one and the same material and may have the same softness over its entire length and/or within its entire cross-section. However, alternatively, it may also be produced according to so-called "multiple-component-extrusion-technology", by which method one can achieve that portions with different elasticities and/or softnesses, or even with different materials, are unified into becoming one single, unitary body constituting the damping element D.

The invention claimed is:

1. Tensiometer for measuring the force imparted by a yarn to a bending element disposed for deflection by the yarn, comprising a unitary damping element made of an intrinsically damping material like rubber or an elastomer, the damping element comprising a base body secured to the bending element and an oscillation body which can oscillate in relation to the base body and to the bending element at least essentially in the direction in which the bending element is deflected by the yarn, the damping element having substantially the shape of a U and including a first U-leg, a second U-leg and a U-bend, the first U-leg forming the base body and having an outer side secured to the bending element, the second U-leg forming the oscillation body and extending at a distance from the base body and the bending element, the damping element including an energy dissipation zone between the oscillation body and the base body, the U-bend of the damping element defining the energy dissipation zone.

2. Tensiometer as in claim 1, wherein the first U-leg extends substantially in a longitudinal direction of the bending element, and the U-bend has an outer side which faces an end region of the bending element contacted by the yarn, the outer side of the U-bend being located in the vicinity of the end region of the bending element.

3. Tensiometer for measuring the force imparted by a yarn to a bending element disposed for deflection by the yarn, comprising a unitary damping element made of an intrinsically damping material and comprising a base body secured to the bending element and an oscillation body which is contiguous with the base body and can oscillate in relation to the base body and to the bending element at least essentially in the direction in which the bending element is deflected by the yarn, the oscillation body including a first portion disposed immediately adjacent the base body and a second portion defining a terminal free end of the oscillation body spaced from the base body, and the damping element including an energy dissipation zone disposed between the oscillation body and the base body.

4. Tensiometer according to claim 3, wherein the bending element has an end contacted by the yarn, the tensiometer further including a wear protector disposed to clamp the base body of the damping element to the end of the bending element.

5. Tensiometer according to claim 3, wherein the damping element has the shape of a Z including a first Z-leg, a second Z-leg and a third Z-leg, the first Z-leg forming the base body, the second Z-leg forming the first portion of the oscillation body and interconnecting the first and third Z-legs, the third Z-leg forming the second portion of the oscillation body, a first energy dissipation zone is defined at a junction between the first Z-leg and the second Z-leg, and a second energy dissipation zone is defined at a junction between the second Z-leg and the third Z-leg.

6. Tensiometer according to claim 3, wherein the base body of the damping element is collar-shaped, and at least partially surrounds the bending element with a radial pre-load.

7. Tensiometer according to claim 6, wherein the base body is ring-shaped or C-shaped and substantially surrounds the bending element, and the second portion of the oscillation body defines a tab which protrudes from the base body crosswise to the deflection direction of the bending element, the energy dissipation zone lying between the tab and the base body.

8. Tensiometer according to claim 7, wherein the tabs are two in number and protrude in opposite directions from the base body.

9. Tensiometer according to claim 3, wherein the oscillation body and the base body comprise a one-piece unitary component.

10. Tensiometer according to claim 3, wherein the second portion of the oscillation body is disposed in an essentially parallel manner with the base body and is spaced outwardly therefrom.

11. Tensiometer for measuring the force imparted by a yarn to a bending element disposed for deflection by the yarn, comprising a unitary damping element made of an intrinsically damping material like rubber or an elastomer, the damping element comprising a base body secured to the bending element and an oscillation body which can oscillate in relation to the base body and to the bending element at least essentially in the direction in which the bending element is deflected by the yarn, the damping element having the shape of a substantially L-shaped hook including a first L-end, a second hook-shaped L-end and a L-bend, the first L-end being secured to the bending element in a butt-joint and constituting the base body, the second hook-shaped L-end constituting the oscillation body and extending laterally or longitudinally at a distance from the bending element, the damping element including an energy dissipation zone between the oscillation body and the base body, the L-bend of the damping element constituting the energy dissipation zone.

12. Tensiometer for measuring the force imparted by a yarn to a bending element disposed for deflection by the yarn, comprising a unitary damping element made of an intrinsically damping material like rubber or an elastomer, the damping element comprising a base body secured to the bending element and an oscillation body which can oscillate in relation to the base body and to the bending element at least essentially in the direction in which the bending element is deflected by the yarn, the damping element substantially having the shape of an S including a first S-leg and a second S-leg, the first S-leg being secured to the bending element, and constituting the base body, the second S-leg extending laterally or longitudinally at a distance from the bending element and constituting the oscillation body, the damping element including an energy dissipation zone between the oscillation body and the base body, the energy dissipation zone being formed in a region of the damping element between the first and second S-legs.

13. Tensiometer according to claim 12, wherein the bending element has an end contacted by the yarn, the tensiometer further including a wear protector disposed to clamp the first S-leg of the damping element to the bending element.

\* \* \* \* \*